United States Patent

[11] 3,616,453

| | | | |
|---|---|---|---|
| [72] | Inventor | John St. Leger Philpot<br>Oxford, England | |
| [21] | Appl. No. | 624,327 | |
| [22] | Filed | Mar. 20, 1967 | |
| [45] | Patented | Oct. 26, 1971 | |
| [73] | Assignee | National Research Development<br>Corporation<br>London, England | |
| [32] | Priority | Mar. 23, 1966 | |
| [33] | | Great Britain | |
| [31] | | 12,875/66 | |

[54] SEPARATION APPARATUS
26 Claims, 6 Drawing Figs.

[52] U.S. Cl............................................... 204/299,
204/300, 204/180 R, 204/180 P, 204/301
[51] Int. Cl...................................................... B01d 13/02,
B01k 5/00
[50] Field of Search......................................... 204/299,
300, 180, 180 P, 301, 302, 304

[56] References Cited
UNITED STATES PATENTS

| 670,351 | 3/1901 | Schwerin.................. | 204/301 |
|---|---|---|---|
| 1,034,668 | 8/1912 | Wright..................... | 204/304 |
| 1,558,382 | 10/1925 | Marx........................ | 204/180 |
| 2,295,476 | 9/1942 | Ibison....................... | 204/300 |
| 2,500,878 | 3/1950 | Sieling..................... | 204/180 |
| 2,648,636 | 8/1953 | Ellis et al. ................ | 204/299 |
| 2,739,938 | 3/1956 | Wiechers.................. | 204/301 |
| 3,005,763 | 10/1961 | Kollsman.................. | 204/180 P |
| 3,197,394 | 7/1965 | McEuen.................... | 204/180 |

OTHER REFERENCES

Kolin, " Continuous Electrophoretic Fractionation Stabilized by Electromagnetic Rotation" Proceedings National Academy of Sciences, vol. 46, 1960 pp. 509– 523

Primary Examiner—John H. Mack
Assistant Examiner—A. C. Prescott
Attorney—Cushman, Darby & Cushman ABSTRACT: The invention relates to separation apparatus, which utilizes an annular chamber extending between outer and inner walls of which at least the outer wall is continuously rotated to provide across the annular chamber a stabilizing field inhibiting mixing between laminae of fluid flowing along the annular chamber.

SEPARATION APPARATUS

This invention relates to separation apparatus, and although the invention finds particular application to electrophoretic separation apparatus, it is capable of much wider general application.

Separation apparatus may be defined as apparatus for causing one or more components, called collectively the "migrant" and which are uniformly or nonuniformly dissolved or dispersed in one or more relatively continuous fluids, to be partly or wholly separated from each other and/or from the fluid or fluids. By way of example the migrant component might be a population of identically similar or nearly similar atoms, molecules, particles, droplets, bubbles or structures such as biological cells; the fluid might be liquid or gaseous and the term "relatively continuous fluid" is used to include for example droplets containing dissolved migrant and themselves contained in another fluid, as might occur in separators employing partition between two solvents.

The separation achieved in such separation apparatus depends upon a relative motion between the components of the "migrant," or between the migrant and the fluid. This relative motion occurs as a differential response to one or more of a variety of force fields, each producing its own type of migration. Thus migration in an electric field is called "electrophoresis;" in a magnetic field is called "magnetophoresis" in a centrifugal and/or gravitational field is called "sedimentation;" and in a chemical field is called "diffusion" or "dialysis" if a membrane is used to magnify the ratios of diffusion constants, is called "partition" if two incompletely miscible solvent fluids are concerned, or is called "absorption" if there is adherence to a solid surface. The separation apparatus is accordingly classified as electrophoretic, magnetic, centrifugal, or chemical (which latter may be diffusive, dialytic, partitive or absorptive) according to the force field mainly employed, which is chosen to suit the properties of the migrant.

Separation apparatus can be classified as either "analytic" or "preparative" according to its main purpose, and can be classified as of the "batch" type or of the "continuous" type depending upon whether the migrant and the fluid are introduced and removed in batches or whether they are introduced and removed continuously. Intermediate types are also possible. The traditional cream separator is thus a preparative continuous centrifugal separation apparatus whose migrant is droplets, mainly of fat, and whose continuous fluid is skim milk.

A difficulty which arises in some separation apparatus is that of undesirable mixing of different regions of the fluid, which mixing may wholly or partially annul the separation. In separation apparatus, mixing is often prevented or reduced by "stabilization." For example, "solid stabilization" consists in moderating the movement of the fluid by the use of a porous solid such as a diaphragm, a membrane, or a column of suitable powder. Further "density stabilization" consists in the provision of an anticonvective density gradient whereby the density increases in the direction of the combined gravitational and/or centrifugal fields.

According to the present invention, separation apparatus comprises an annular chamber extending axially between concentric outer and inner walls, means by which a migrant material and a relatively continuous migrant supporting fluid can be introduced into the annular chamber at first axial locations therein, means by which the migrant material is subjected to a force field such as to produce a differential response, as regards movements having a radial component, between components of the migrant and/or the migrant and the supporting fluid, means for selectively removing from the annular chamber, at further locations axially remote from the first location at which the migrant is introduced, separated fractions of the migrant and/or the supporting fluids and means by which the outer wall can be rotated about its axis at a steady speed in such a manner as to produce relative rotation between the inner and outer walls about their common axis, thereby to stabilize flow conditions in the flow chamber and to avoid mixing between laminae of fluid flowing along the annular chamber.

The invention will now be described, by way of example, with reference to the accompanying drawings, in which.

Figure 1:
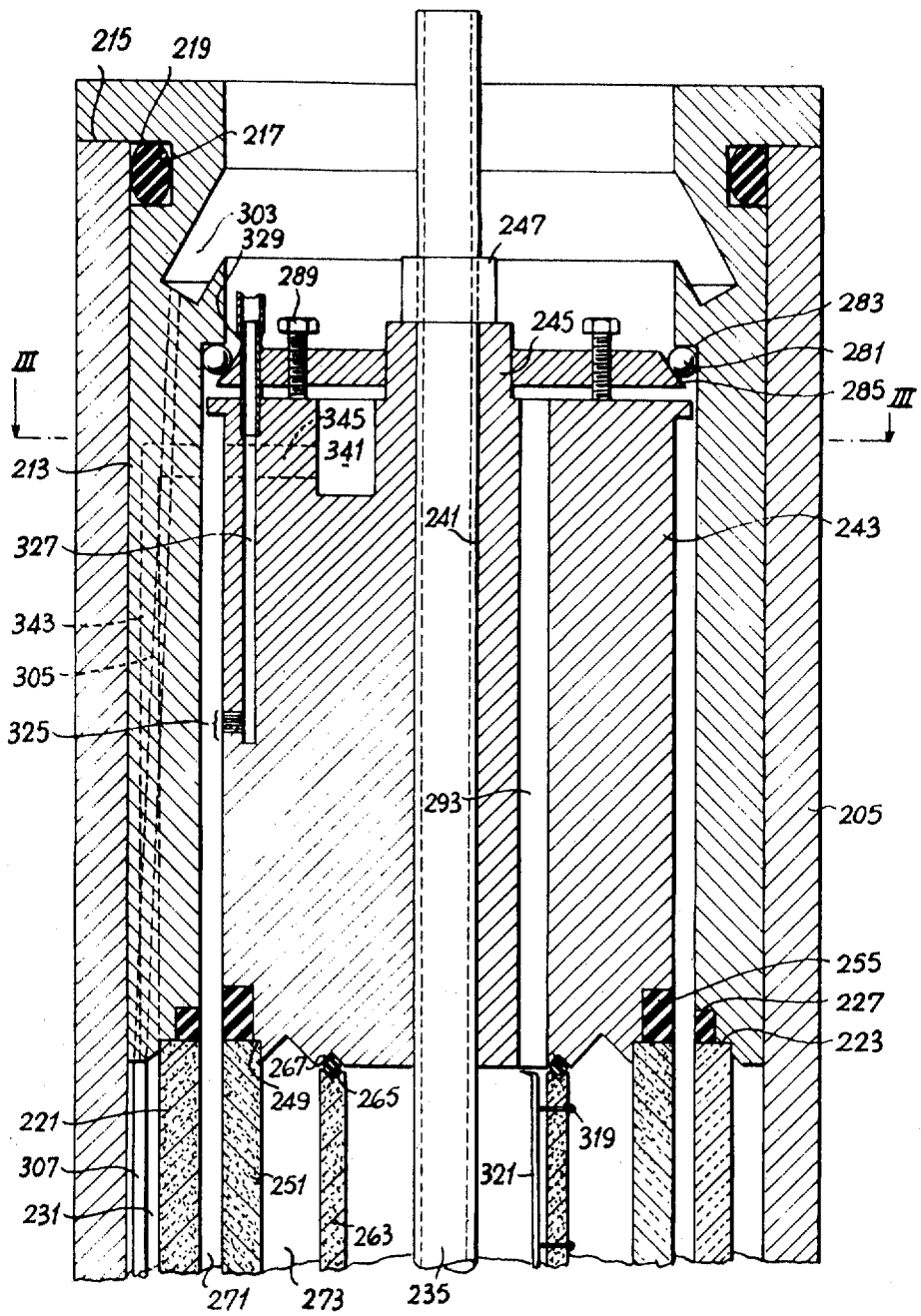
FIG. 1 is a sectional side elevation of the upper part only of an electrophoretic separation apparatus.
Figure 2:
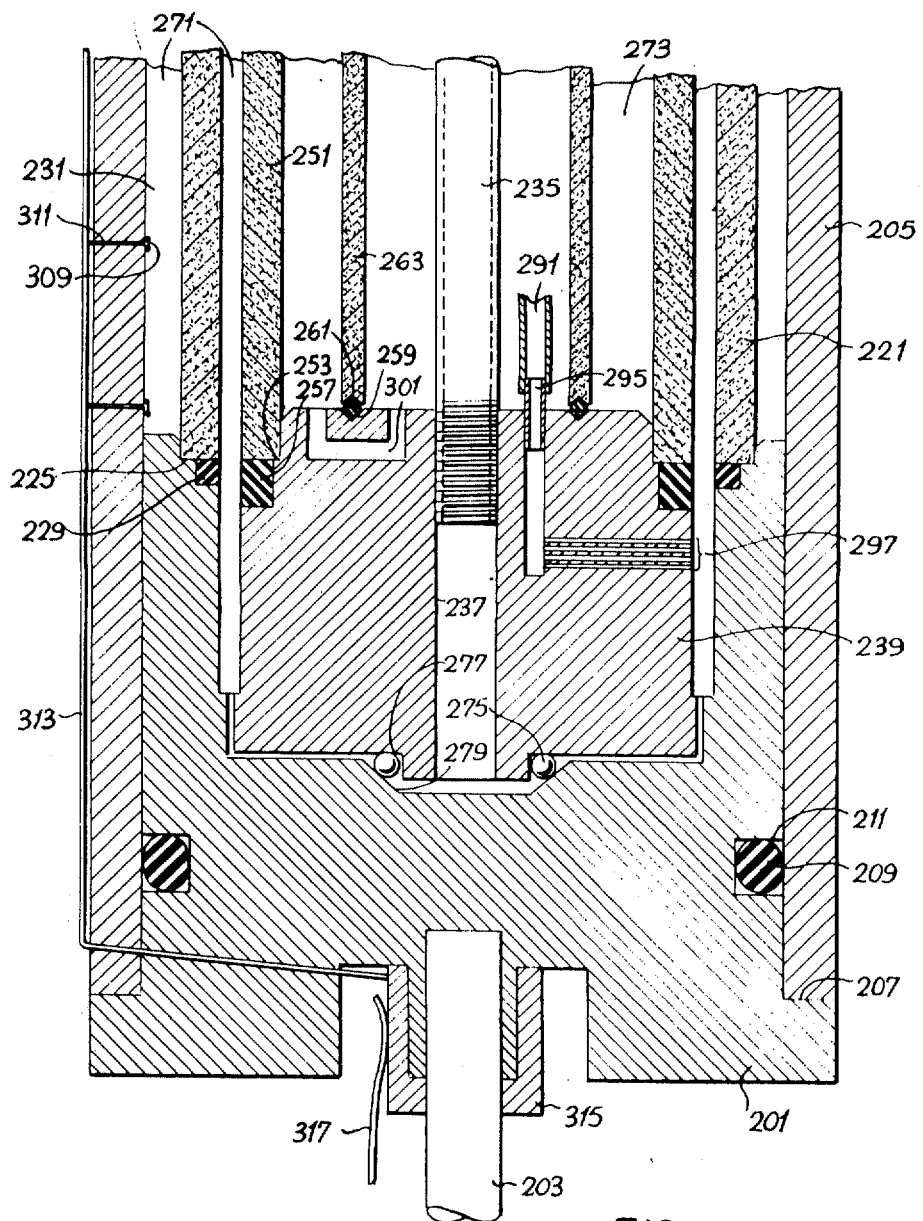
FIG. 2 is a sectional side elevation of the lower part only of the apparatus shown in FIG. 1.

Referring first to the embodiment of the invention shown in FIGS. 1 to 4, a cup shaped base member 201 of the electrophoretic separation apparatus is keyed to a vertical drive shaft 203 connected to a driving electric motor (not shown). A cylindrical outer jacket 205 fits snugly about the upper part of the skirt of member 201 and is drawn downwardly by clamping screws (not shown) against an annular shoulder 207 on that member. An Q-section resilient sealing ring 209 trapped in a peripheral groove 211 in member 201 ensures a liquidtight seal between the lower end of jacket 205 and member 201. The upper end of the jacket 205 fits snugly about a sleeve member 213 which is drawn downwardly by clamping screws (not shown) against an annular shoulder 215 on that member. An O-section resilient sealing ring 217 trapped in a peripheral groove 219 in member 213 ensures a liquidtight seal between the upper end of jacket 205 and member 213. Concentrically arranged inside the jacket 205 is a permeable cylindrical sleeve 221 of acrylic granules sintered and impregnated with polyacrylomide gel, this sleeve engaging at its upper and lower ends respectively shoulders 223 and 225 provided on the sleeve member 213 and the base member 201 and also engaging upper and lower resilient sealing rings 227 and 229. The jacket 205 and the sleeve 221 together bound an outer electrode compartment 231.

Inside the assembly described above is fitted a stator including a central stainless steel tube 235 having a screw-threaded lower end fitted into a screw-threaded part of a central bore 237 of a stator base member 239. At its upper end the tube 235 extends through a bore 241 in a fractionator 243 which is in the form generally of a cylindrical block provided at its upper end with a boss 245 against which bears a ring 247 clamped to the tube 235. The fractionator is provided on its lower surface with an annular shoulder 249 engaging the upper end of a permeable sleeve 251 similar to the sleeve 221 and the lower end of which engages a similar shoulder 253 on the base member 239. Upper and lower sealing rings 255 and 257 complete respectively fluid tight seals between the sleeve 251 and the fractionator and the base member. The upper surface of the base member is formed with a groove 259 containing a resilient O-ring 261 which fits partly inside a similar groove in the lower end of an impermeable sleeve 263. At its upper end the sleeve 263 is grooved in a similar manner and contains a resilient O-ring 265 which fits partly in a groove 267 in the lower surface of the fractionator 243.

It will be seen that in addition to the outer electrode compartment 231 there is an annular separation chamber 271 bounded by the permeable sleeve 221 and 251, and an inner electrode compartment 273.

The stator and the rotor parts of the separation apparatus are relatively positioned by a lower ball race 275 consisting of stainless steel balls trapped between a corner 277 on the stator base member 239 and an inclined shoulder 279 on the rotor base member 201, and by an upper ball race 281 consisting of stainless steel balls trapped between a corner 283 on the sleeve member 213 and an inclined shoulder 285 provided on an inner race 287 which is in the form of a disc centrally apertured to fit over the boss 245 and carrying six evenly spaced adjusting screws 289 arranged to bear at their lower ends against the top of the fractionator 243. The tube 235 is tightened into the stator base member 239 sufficiently to make the assembly of fractionator, base member, sleeves and tube rigid. The adjusting screws 289 are then adjusted to remove any axial play between the stator and the rotor. The upper end of the tube 235 is clamped in a suitable support while the lower end of the rotor is positioned laterally by the bearing carrying the drive shaft 203 so that the apparatus operates stably even when the rotor is revolving at relatively high speed. Dilute electrolyte is fed downwardly through the tube 235 through the bore 237 in the stator base member 239, radially outwardly between the balls of the lower race 275 and through the clearance between the stator and the rotor, and axially into the bottom end of the separation chamber 271. The liquid migrant is fed downwardly through a polythene tube 291 extending through a port 293 in the fractionator and disposed in the annular space between the sleeve 263 and the tube 235, through a stainless steel nozzle 295 mounted in the stator base member 239 and through a passage formed in that member and is discharged through a set of seven small horizontal holes 297, arranged in two staggered vertical rows, into the separation chamber 271. These seven holes together act like a slit, but are easier to form than a slit. With such a slit-like arrangement, the migrant is caused to flow as a substantially uniform flat helical ribbon between the stationary inner sleeve 251 and the rotating outer sleeve 221.

Fresh concentrated electrolyte is fed continuously to the bottom end of the inner electrode compartment 273 through a passage 299 formed in the fractionator 243, downwardly in the annular space between the tube 235 and the sleeve 263, and through a U-shaped passage 301 in the stator base member 239. Fresh concentrated electrolyte is fed continuously to the bottom of the outer electrode compartment 231 through an annular filler groove 303, a passage 305 in the sleeve member 213, and a polythene tube 307. It will be appreciated that where a single passage 305 is shown, a symmetrical arrangement of such passage is provided to provide a balanced rotor.

An outer electrode 309 is disposed inside the outer electrode chamber 231 and consists of an eight-start internal helix of fine platinum wire soldered by loops 311 to eight equally spaced external paraxial strands of coarse tinned copper wire, such as strand 313, which strands are anchored and are protected from corrosion by acrylic cement. The copper wire strands are soldered to a slipring 315 which is mounted on a boss provided on the lower surface of the rotor base member 201, to which slipring electric current is fed in use through springy brass fingers 317. An inner electrode 319 is a 16-start helix of fine platinum wire carried by seven circles of tinned copper wire on the outer surface of the sleeve 263 these forming the ends of a seven-strand insulated cable 321 which extends upwardly through a passage 323 provided in the fractionator 243, to the second pole of the electrical supply which feeds the brass fingers 317. The tinned copper wire and the solder joints with the platinum wire are protected with acrylic resin.

The fractionator 243 has a peripheral outer surface which bounds the inner side of the upper part of the annular separation chamber 271. This peripheral outer surface is provided with 24 sets of small radial holes 325, the holes in each set being chosen in size, number and spacing so that each set acts like a slit differing in length from neighboring sets but having substantially the same flow resistance. Each set of holes communicates with a vertical passage 327 in the fractionator which serves only that set of holes. These 24 sets of holes are suitably distributed in a triangular area defined at its lower edge by a single turn of a helical curve traced on the peripheral outer surface of the fractionator and by a circle at its top edge. Into the upper end of each vertical passage 327 is fitted a stainless steel tube 329 to which is coupled, above the fractionator, a component extracting tube (not shown) these tubes leading respectively to 24 vessels in which the separated components can be individually collected.

In use of the separator, the stator is held against rotation by the clamping support which engages the upper end of the tube 235, while the rotor is rotated at a speed of 300 to 600 revolutions per minute by the shaft 203. The appropriate speed will depend upon the dimensions and is selected to give the right Reynolds number. A suitable electrical potential is applied between the inner and outer electrodes 319 and 309, and establishes a radial potential gradient in the dilute electrolyte which is flowing axially up the separation chamber 271. The migrant introduced to the separation chamber 271 near its lower end through the holes 297 flows upwardly as a substantially uniform flat helical ribbon in the separation chamber. The components of the migrant migrate inwardly from adjacent the inner wall of the separation chamber under the influence of the applied electric field. The degree of migration will be different for different components of the migrant so that by the time the ribbon of migrant enters the space between the fractionator 243 and the sleeve 213 these components will lie in different radial laminae of the ribbon. The liquid which is flowing upwardly and circumferentially in a helical path in the separation chamber 271 is drawn off, lamina by lamina, in 24 stages by the 24 sets of holes 325. Thus different components will be drawn off by different sets of holes, and will flow through the associated passages 327 to different collecting vessels.

Figure 3:
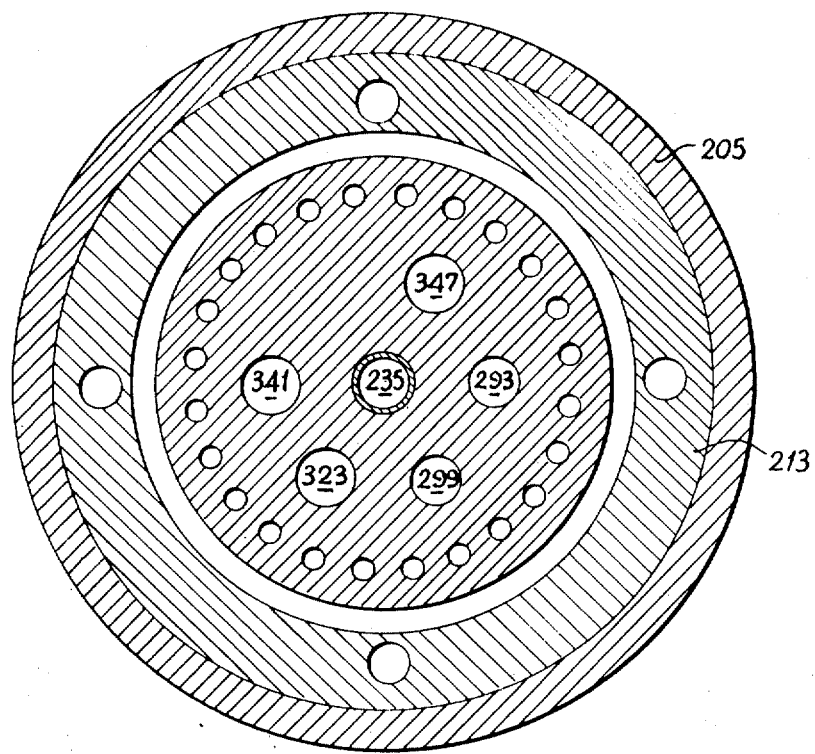
FIG. 3 is a sectional plan view taken on the line III—III of FIG. 1.

It will be seen in FIG. 3 that within the circle of passages 327 are five larger holes. Of these holes, hole 341 provides for the escape of gas from the outer electrode compartment 231, this gas rising from the upper end of compartment 231 through a passage 343 in the sleeve 213 and sedimenting inwards across the upper end of the separation chamber 271 and into a radial passage 345 leading to the hole 341. Another hole 347 permits the escape of gas from the inner electrode compartment 273. Both the holes 341 and 347 are connected by suitable piping to disposal points. Thus hole 347 is connected to a small cistern (not shown) in which the gas is separated from used electrolyte and from which fresh electrolyte is supplied.

It has been found that, with the apparatus described above with reference to FIGS. 1 to 3, the laminar flow is stabilized without the need for the use of a separation chamber of very small radial width. Further, the limitation in permitted strength of the electric field, which when excessive can cause turbulence through dielectric instability is avoided. With stabilization effected by the gradient of angular velocity produced in a fluid filling the space between an outer rotating wall and an inner stationary wall, higher field strengths are permissible and the need for multiple crossing of the flow channel is avoided.

Figure 4:
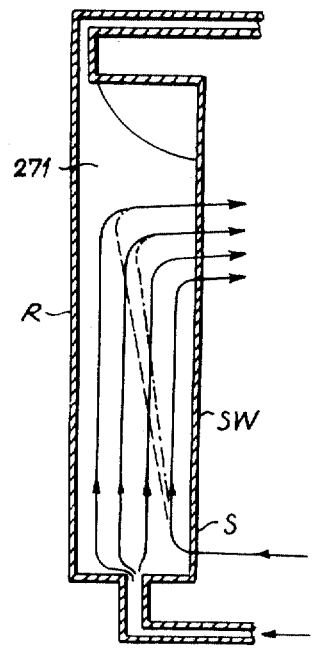
FIG. 4 is a diagram showing fluid flows in the left-hand radial section of the apparatus of FIGS. 1 to 3.

FIG. 4 is a radial cross section and illustrates in a diagrammatic manner, not to scale, the operation of the separation chamber 271. The migrant enters from the inner nonrotating wall SW while the dilute electrolyte enters axially through the narrow annular gap between the rotating and nonrotating parts R and S respectively of the separator. The migrant and the dilute electrolyte flow upwardly in the separation chamber with the migrant radially inwards of the electrolyte. These liquids are removed in fractions and the presence in the upper end of the separation chamber of gas flowing inwardly from the outer electrode compartment diminishes the end effects permitting the use of fractionators up quite near to the meniscus. In this FIG. 4 the thin continuous lines indicate flow lines of the liquids while the dotted and dashed lines indicate the paths respectively of two of the migrant components as they move radially outwardly under the influence of the force field. It will be seen that these two components are in different radial laminae of the liquid reaching the fractionator at the upper end of the separation chamber.

In the arrangement of FIGS. 1 to 4, there is conflow of the dilute electrolyte liquid and the migrant. In an annular chamber having end walls which either revolve with the outer wall or remain stationary with the inner wall, some degree of counterflow will tend to be introduced unless the effect of the end walls is swamped by a sufficiently large total flow to give nonparabolic conflow, or unless the liquid flowing in the annular chamber is separated from the end walls by a much less viscous fluid, for example a gas. However, this can be done conveniently only at the top end of a vertical annular chamber, and it may encourage turbulence. At the solid ends of an annular chamber, perfect compatibility can be achieved only by means of the use of an infinite number of concentric rings rotating respectively at each of the possible speeds lying between the speeds of the outer and inner walls. In the apparatus described, at the upper end of the annular chamber gas is used to reduce end effects, while at the lower end of the chamber the outer third of the width of the end wall rotates at the speed of the outer wall, the inner third of the width is stationary, as is the inner wall, and the central third of the width is accounted for by the passage for the admission of the dilute electrolyte.

In some important applications of the invention, for example in that described above, axial conflow is preferred to axial counterflow. In practice, a good approximation to "annular velocity gradient" stabilized parabolic axial flow can be obtained by the use of cylindrical walls, the inner wall being stationary, or rotating in the same direction as the outer wall but more slowly provided that end effects are largely suppressed as already described or are localized by making the thickness of the annular chamber small compared with its length. Parabolic axial flow refers to the distribution of the axial velocity across the radial width of the annular chamber. For the present discussion the circumferential component of the velocity of the liquids is ignored.

Figure 5:
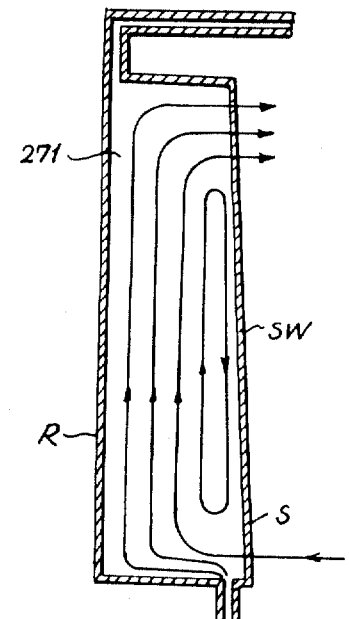
FIGS. 5 and 6 are diagrams similar to FIG. 4 but showing fluid flows in alternative forms of the apparatus.

Axial conflow may advantageously be applied in a centrifuge to the fractionation of fairly rapidly sedimenting migrants such as biological cells and/or cell organelles (mitochondria, nuclei and the like). Thus the centrifuge can be provided with a nonrotating inner wall, or an inner wall rotating at a lesser speed that the outer wall, to give an "angular velocity gradient" stabilized annular separation chamber. This removes the need for density stabilization, and the feed of materials to the centrifuge is simplified. The use of a more slowly rotating inner wall, while still providing a gradient of angular velocity, has the advantage over the stationary wall (at the cost of some other complications) that the centrifugal field may be made strong throughout the annular chamber. Alternatively, the region of weak centrifugal field near a stationary wall may be separated from the sedimenting migrant by an inner stream of auxiliary fluid. This fluid may be continuously fed, in conflow with the migrant, or it may be reused repeatedly if some counterflow is introduced by a slight taper on the inner wall, so that with suitable adjustment of the main flow rate the continuously fed migrant and conflowing outer layering fluid into which it sediments are separated from the inner wall by a cushion of unrenewed axially circulating fluid of which the inner half is counterflowing. Such an arrangement is illustrated in FIG. 5. Where a strong centrifugal field is required, for slowly sedimenting migrants, turbulence must be avoided either by extremely precise concentricity and balancing and attention to reduction of end wall effects, or by diminution in the diameter of the stationary inner wall, which results in a loss of angular-velocity-gradient stabilization near the outer wall. In the arrangement shown in FIG. 5, the taper, like the rest of the diagram, is not drawn to scale, and the angle to be used depends upon a number of factors.

In some cases it may be considered desirable to provide for uniform gentle counterflow in the separation chamber between the flow of a first liquid and the flow of a second liquid. Where uniform gentle counterflow is required, stabilized by an extensive gradient of angular velocity, the preferred method is by straight or curved tapering of the inner and/or outer wall of the annular chamber in cooperation with carefully designed end walls. Only a slight taper is needed to give a rapid stabilized counterflow through the whole chamber. Steeper tapering may cause turbulence at all but the lowest speeds. The chief applications of counterflow are in separators based on sedimentation, diffusion or partition or on combination of these, such as "sedimentation equilibrium." For example, an "angular velocity gradient" stabilized partitive separator may be made in this way with thin layers of two solvents moving axially in opposite directions. The centrifugal force of the rotation is useful in this system for overcoming surface tension which might otherwise collect the thin layers into drops.

Figure 6:
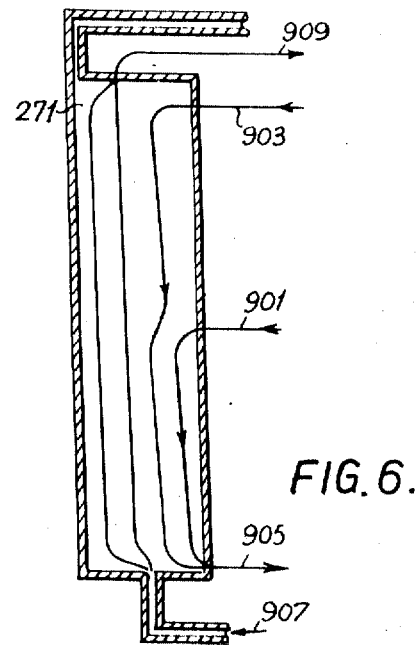

FIG. 6 illustrates a full counterflowing system maintained by tapering of both walls. The feed system shown is particularly suitable for a separator based on partition between two solvents. In the example shown, a concentrated solution of migrant in a first solvent A is fed in slowly at 901 while a faster stream of solvent A is fed in at 903 and extracted at 905. A second and heavier solvent B is fed in at 907 and is extracted at 909. Migrant components having partition coefficients above or below a critical value emerge at 905 or 909 respectively. The critical value may be altered by varying the relative rates of flow of the solvents. With suitable design and adjustment of the counterflow, parameters such as speed may be arranged optimally so that the line of zero axial flow rate coincides with the boundary between the solvents. In this application, the annular flow passage is preferably quite thin.

It will be appreciated that the preferred examples of the apparatus described above may need modification to meet special requirements. For example, in the separator of FIGS. 1 to 3 in the unusual case where components of opposite charge are to be separated, a second ribbon of dilute electrolyte, across which the component concerned can migrate, may be formed similarly inside the migrant ribbon. The width of these ribbons would preferably be made equal to the pitch of the spiral flow near the inner wall of the separation chamber, so that they merge to form continuous hollow cylinders of migrant and dilute electrolyte respectively.

The use of acrylic resin for ball races, integral with the rest of the structure, has been found satisfactory and simplifies the design of the apparatus. The speed of rotation need not be high for an electrophoretic separator. The Reynolds number R is preferably kept below $3 \times 10^4$ to give a good tolerance for eccentricity and vibration. Stabilization against convective density gradient is independent of speed and can be made adequate by making the value of $$4r_2^2/(r_2^2-r_1^2)$$

reasonably small, where $r_1$ and $r_2$ are respectively the radii of the inner and outer walls of the separation chamber. Stabilization towards dielectric forces increases with speed, but $R=3 \times 10^4$ has been found to be adequate.

In designing the apparatus, the walls defining the main flow channel are arranged to have pores which are sufficiently small to prevent gas generated in the electrode compartments from entering the main flow channel, but which at the same time are not so small as to require excessive pressure to force air out of them.

Satisfactory results have been obtained with spherical acrylic granules, preferably fractionated by sieving, which were sintered at about 170° C. The preferred granule diameter for general purposes is about 0.002 inch or somewhat less for electrode compartment walls. Other sintered material, e.g. polystyrene, polyethylene, polypropylene, glass or quartz should also be satisfactory, and for fine pore size nonsintered plastics such as collodion, regenerated cellulose or polyacrylamide gel may be used, preferably reinforced to give rigidity. Alternatively a porous thermosetting resin, such as urea-formaldehyde formed in water at fairly high dilution, may be used. A further material for these walls is sintered acrylic granules impregnated with polyacrylamide gel. The air is removed before impregnation and thereafter the walls are kept wet. By the use of more concentrated polyacrylamide the reinforcement with acrylic granules may be avoided.

The fractionator 243 which has been described above can be modified in several ways. Thus in a modified fractionator there is a pile of 24 ring ducts of approximately square cross section, each fed from the annular chamber by 32 fine radial holes which are uniformly spaced circumferentially. Each set of 32 holes lies at the deep end of a shallow conical depression in the inner wall of the annular chamber. Thus there are 24 shallow conical depressions forming a slightly saw-toothed pattern in the longitudinal section of the inner wall near the top. The outlet from each of the 24 ring ducts consists of a single radial hole of cross section comparable with that of the duct, communicating with a paraxial outlet hole leading to the top end of the fractionator. The 24 paraxial outlet holes are arranged in a circle as in the embodiment of the invention illustrated in the drawings.

As regards the permeable walls of the part of the annular chamber below the fractionator 243, alternatively they can consist of a gel made from an aqueous solution of polyvinyl alcohol with or without an additive such as ethylene glycol. The polyvinyl alcohol is cross-linked with a dialdehyde such as malonaldehyde, glutaraldehyde or hydroxyadipaldehyde or with the corresponding acetal such as tetramethoxypropane, with the aid of a dilute acid catalyst such as 0.2 molar sulfuric acid with or without some bisulphate. Alternatively dihydroxyacetone may be used with a more concentrated acid catalyst such as 5 to 10 molar sulfuric acid. The gel is preferably formed on a rigid support consisting of a tube of acrylic resin drilled with numerous radial holes, with grooves and rings at the ends to protect and seal the ends of the gel. The casting of the gel is preferably carried out by a centrifugal casting method.

In order to improve the supply of electricity to the rotating outer electrode, the electrical contact can be arranged actually on the axis of rotation. To make this possible, the rotor is driven by a synchronous motor connected through a pulley and a rubber belt which encircles the pulley and the rotor near its lower end. Alternatively a friction wheel drive or a gear drive could be used. The electrical supply is through a male wide-angle conical brass rotating member mating with a complementary female nonrotating member coated with a paste of graphite and a solution of acrylic resin in a volatile solvent such as chloroform, which compresses and binds the graphite by evaporation. The rotating member projects through an inner ball race which supports the rotor and centers its bottom end.

The top bearing can alternatively be a pure journal bearing, and then can be a plain i.e. not ball bearing. It can be formed by a downward tubular projection of a top cap of the rotor, and extend above and below the hole in the stator through which gas escapes from the rotor. Electrolyte escaping through the top part of the plain bearing, and serving to lubricate that bearing, is centrifuged off the top of the rotor and collected in a surrounding stationary annular trough.

If desired the rubber rings that seal the junctions at the ends of the permeable tubes can lie between thin sheaths of acrylic resin so that the walls of the annular chamber are smooth and dimensionally well defined throughout.

I claim:

1. Separation apparatus comprising
   a. an outer cylindrical wall,
   b. an inner cylindrical wall coaxial with said outer cylindrical wall and spaced radially inwardly therefrom,
   c. a substantially uninterrupted annular chamber the axial length of which is defined by said inner and outer cylindrical walls, said apparatus having first and second axial ends defining the ends of said annular chamber,
   d. port means arranged for the discharge of a migrant material and a relatively continuous migrant supporting fluid into the annular chamber near the first end thereof,
   e. radial migration force field producing means for producing a relative motion between the migrant material and the migrant supporting fluid, or between components of the migrant material,
   f. a plurality of port means, separated one from the other in the axial direction of said annular chamber, for the selective removal from said annular chamber, near said second end thereof, separated fractions of said migrant, and
   g. rotation means for producing a relative rotation between said inner and outer walls about their common axis to stabilize flow conditions in said annular chamber, thereby discouraging mixing between laminae of fluid flowing through said annular chamber, by rotating at least said outer cylindrical wall about its axis at a steady speed.

2. Separation apparatus according to claim 1, in which:
   a. a fixed assembly including the inner wall is laterally held at or near said second end;
   b. a rotatable assembly including the outer wall encircles the fixed assembly; and
   c. bearings acting between the fixed and rotatable assemblies maintain the specified spacing of the outer and inner walls.

3. Separation apparatus according to claim 1, in which:
   a. a driving shaft extends coaxially downwards from the rotatable assembly;
   b. the driving shaft is coupled to the rotatable assembly; and
   c. driving means disposed below the rotatable assembly are coupled to the driving shaft.

4. Separation apparatus according to claim 2, in which:
   a. the rotatable assembly carries a driving surface;
   b. a driving member is disposed beside the rotatable assembly and is arranged to drive said rotatable assembly through the driving surface.

5. Separation apparatus according to claim 1, in which:
   a. the means arranged to remove selectively the separated fractions comprise a device having a substantially cylindrical outer surface forming a coaxial continuation of the inner wall;
   b. the device is formed with spaced apertures in the cylindrical outer surface; and
   c. the device is formed with separate fluid withdrawal passages communicating respectively with the spaced apertures; the arrangement being such that in use samples of the migrant supporting fluid drawn off respectively through these passages contain different fractions of the migrant material 6. Separation apparatus according to claim 5, in which the apertures for collection of any one fraction are fine radial holes spaced uniformly round the circumference and communicating with a ring duct of approximately square cross section, the ring ducts for successive fractions being arranged in a coaxial row.

7. Separation apparatus according to claim 6, in which the cylindrical outer surface is formed with shallow conical depressions serving to guide the fractions into the radial holes.

8. Separation apparatus according to claim 1, in which the port means by which the migrant is fed into the annular chamber consist of one or more paraxial lines of small bores.

9. Separation apparatus according to claim 1, in which the port means by which the migrant is fed into the annular chamber consist of one or more circumferential lines of small bores.

10. Separation apparatus according to claim 1, in which the inner and outer walls both rotate about a common axis but the outer wall rotates at a greater angular velocity than the inner wall so as to produce the specified relative rotation between the inner and outer walls.

11. Separation apparatus according to claim 1, in which the axis of rotation of the outer wall is vertical and means are provided for causing a flow of the migrant material upwardly through the annular chamber.

12. Separation apparatus according to claim 11, in which:
   a. the annular chamber extends upwardly beyond the means for selectively removing the separated fraction from the annular chamber, and
   b. a passage means is provided in the upper part of the annular chamber for the continuous removal of migrant supporting fluid.

13. Separation apparatus according to claim 12, in which the upper part of the annular chamber is provided with means for the continuous removal of separated gas.

14. Separation apparatus according to claim 12, in which:
   a. a second annular chamber surrounds the outer wall and rotates with that wall; and b. an upper part of the first-mentioned annular chamber is arranged to receive gas separating from electrolyte disposed in that second annular chamber.

15. Separation apparatus according to claim 11, in which the bottom end of the annular chamber comprises:
a. a radially inner annular wall region which remains stationary relative to the inner wall;
b. a radially outer wall region which partakes in the rotation of the outer wall; and
c. an intermediate annular region formed by an entry for the continuous supply of dilute electrolyte to the bottom end of the chamber.

16. Separation apparatus according to claim 1, in which the force field is an electric field applies between electrodes placed adjacent respectively the outer and inner walls.

17. Separation apparatus according to claim 16, in which:
a. the outer and inner walls are porous walls,
b. a chamber adapted to be filled with electrolyte surrounds the outer walls; and
c. a chamber adapted to be filled with electrolyte is encircled by the inner wall.

18. Separation apparatus according to claim 17, in which the outer and the inner walls are formed of acrylic granules sintered and impregnated with cross-linked polyacrylamide gel.

19. Separation apparatus according to claim 17, in which the outer and inner walls are mainly formed of cross-linked polyvinyl alcohol gel supported by perforated tubes of acrylic resin.

20. Separation apparatus according to claim 19, in which the perforated tubes are provided with grooves and/or rings at their ends to afford protection, sealing and dimensional stability.

21. Separation apparatus according to claim 17, in which at least one of the electrolyte chambers contains a mesh of conductive wires by which the electric field is applied.

22. Separation apparatus according to claim 21, in which the mesh of conductive wires is in the form of a multistart helix.

23. Separation apparatus according to claim 22, in which the wires are of platinum.

24. Separation apparatus according to claim 21, in which the wires which serve as the anode are formed of a noble alloy resistant to nascent chlorine.

25. Separation apparatus according to claim 17, in which at least one of the electrolyte chambers contains a graphite surface by which the electric field is applied.

26. Separation apparatus according to claim 17, in which:
a. an electrode is disposed in the outer chamber adapted to be filled with electrolyte;
b. slip ring means are carried by the rotatable outer wall and are electrically connected to the electrode; and
c. fixed contact means are arranged to engage the sliprings for the supply of electrical current thereto.

* * * * *